United States Patent [19]

McAnally et al.

[11] Patent Number: 5,680,293
[45] Date of Patent: Oct. 21, 1997

[54] SCREWLESS HARD DRIVE MOUNTING IN A COMPUTER SYSTEM WITH A CHASSIS VIA A FIRST BRACKET RIGIDLY MOUNTED TO THE CHASSIS AND A SECOND BRACKET MOVABLY MOUNTED TO THE CHASSIS

[75] Inventors: Andrew McAnally; Stephen Cook, both of Georgetown, Tex.

[73] Assignee: Dell U.S.A., L.P., Austin, Tex.

[21] Appl. No.: 713,870

[22] Filed: Sep. 13, 1996

[51] Int. Cl.⁶ .................................. G06F 1/16; H05K 7/12
[52] U.S. Cl. .................................. 361/685; 248/220.22
[58] Field of Search .................... 364/708.1; 248/220.21, 248/220.22; 312/223.2; 360/137; 361/683, 685

[56] References Cited

U.S. PATENT DOCUMENTS

| D. 358,141 | 5/1995 | Pecone et al. . |
| 5,136,466 | 8/1992 | Remise et al. ............................ 361/685 |
| 5,155,662 | 10/1992 | I-Shou . |
| 5,233,594 | 8/1993 | Wilhelm . |
| 5,349,483 | 9/1994 | Tsai . |
| 5,355,267 | 10/1994 | Aoyagi et al. . |
| 5,488,538 | 1/1996 | Wakita . |

FOREIGN PATENT DOCUMENTS

| 0 337 399 A2 | 10/1989 | European Pat. Off. . |
| 0 632 455 A1 | 1/1995 | European Pat. Off. . |
| 0 680 047 A2 | 11/1995 | European Pat. Off. . |

*Primary Examiner*—Michael W. Phillips
*Attorney, Agent, or Firm*—Haynes and Boone, L.L.P.

[57] ABSTRACT

A screwless hard drive mounting in a computer system includes first and second interconnectable brackets. The first bracket is rigidly mounted on the computer chassis and provides a releasable engagement with the hard drive. The second bracket is movably mounted on the chassis and provides a releasable engagement with the hard drive and also provides a releasable engagement with the first bracket. A resilient member is mounted on the first bracket to releasably engage the hard drive and provide a preload between the hard drive and the first bracket. The resilient member further provides electrical grounding and vibration damping.

21 Claims, 7 Drawing Sheets

5,680,293

1

SCREWLESS HARD DRIVE MOUNTING IN A COMPUTER SYSTEM WITH A CHASSIS VIA A FIRST BRACKET RIGIDLY MOUNTED TO THE CHASSIS AND A SECOND BRACKET MOVABLY MOUNTED TO THE CHASSIS

BACKGROUND OF THE INVENTION

The present invention relates generally to mounting a hard drive in a computer system without the use of screws and more particularly to providing interlocking brackets and a resilient support for securing the hard drive.

A typical hard drive mounting device includes a bracket formed of either sheet metal or a synthetic material such as plastic. The bracket is attached to the central processing unit (CPU) chassis in a computer system by a variety of mounting methods including screws, hooks and snaps, or the like. Similarly, the hard drive is then secured to the bracket by the use of about four screws which are inserted through screw holes in the bracket and then threaded tightly into screw holes provided in the hard drive assembly which are aligned with the screw holes in the bracket. Obviously then, removal of the hard drive requires removal of the screws. Both insertion and removal of the screws is time consuming and cumbersome due to the work space restrictions and difficult accessibility.

The purpose and need for securing the hard drive relates to the fact that when the drive operates, the rotational speed of the drive causes vibration of the hard drive which can cause the screws to come loose. This problem is aggravated due to variations in the rotational speed of different drives. Another purpose of the hard drive mounting is to provide an electrical ground with the chassis due to the effects of electro-magnetic interference (EMI) and radio frequency interference (RFI).

Unfortunately, a suitable solution to the problems associated with accessibility and work space restrictions related to installation, repair or removal of hard drives, or the need to secure screws which have become loose due to vibration patterns of the hard drive, have not been satisfactorily addressed by the prior art.

Therefore, what is needed is an apparatus and a method for facilitating the mounting of a hard drive in a computer system without the use of screws. It is also highly desirable to provide additional vibration damping to counter the vibrations caused by operation of the hard drive.

SUMMARY OF THE INVENTION

The present invention, accordingly, provides an apparatus and method for mounting a hard drive in a chassis provided in a computer system without the use of screws to attach the hard drive to a support bracket. To this end, a first and a second bracket are provided. The first bracket is mounted on the chassis and includes a releasable engagement with the hard drive. The second bracket is mounted on the chassis and also includes a releasable engagement with the hard drive. The first and second brackets can be releasably interconnected.

A principal advantage of the present invention is that the hard drive is quickly dropped into place and held in position without screws. This also provides for quick removal of the hard drive. This is in contrast to prior art mounting devices for hard drives which included a sheet metal or a plastic bracket that the hard drive is mounted on, usually with about four screws used to secure the hard drive to the bracket.

2

DESCRIPTION OF THE PREFERRED EMBODIMENTS

Figure 1:
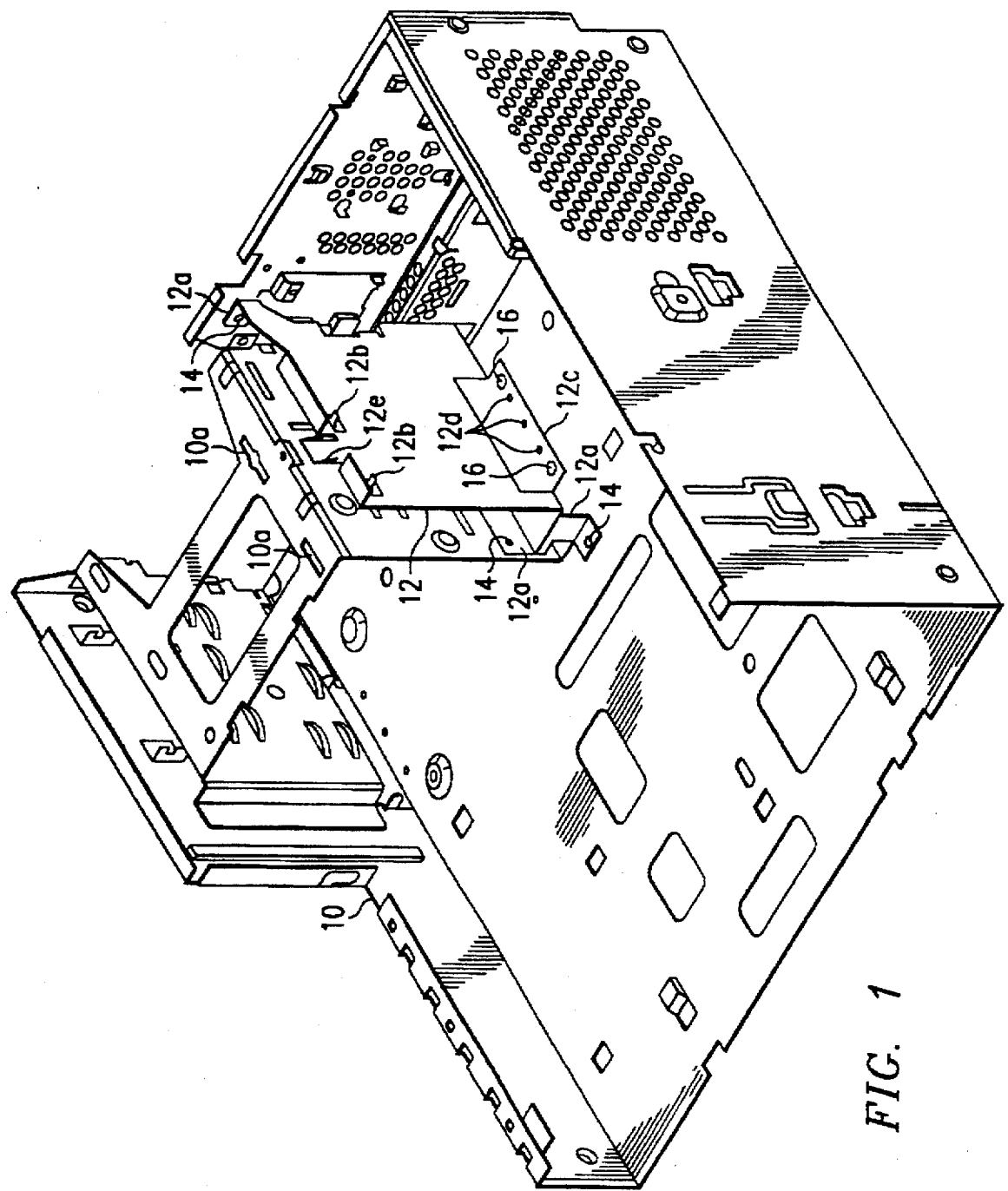
FIG. 1 is an isometric view illustrating an embodiment of a chassis including a hard drive fixed mounting bracket having elastomer bumpers mounted thereon according to the present invention.

Referring to FIG. 1, illustrated is an isometric view of a CPU chassis 10, as is commonly utilized in a computer system providing an environment within which the present invention can operate. Chassis 10 is provided with a bracket 12 attached to chassis 10 by rivets 14 or other suitable means, for rigidly connecting a plurality of flanges 12a of bracket 12 to chassis 10. A pair of tabs 12b extend from an upper portion of bracket 12, as viewed in FIG. 1. Tabs 12b are formed with bracket 12 and are punched and bent to extend outwardly therefrom. Another flange 12c is also formed with bracket 12 and is punched and bent to extend therefrom and includes rivet holes 12d formed therein and a pair of elastomer pads 16 suitably adhered thereto or otherwise mounted thereon.

Figure 2:
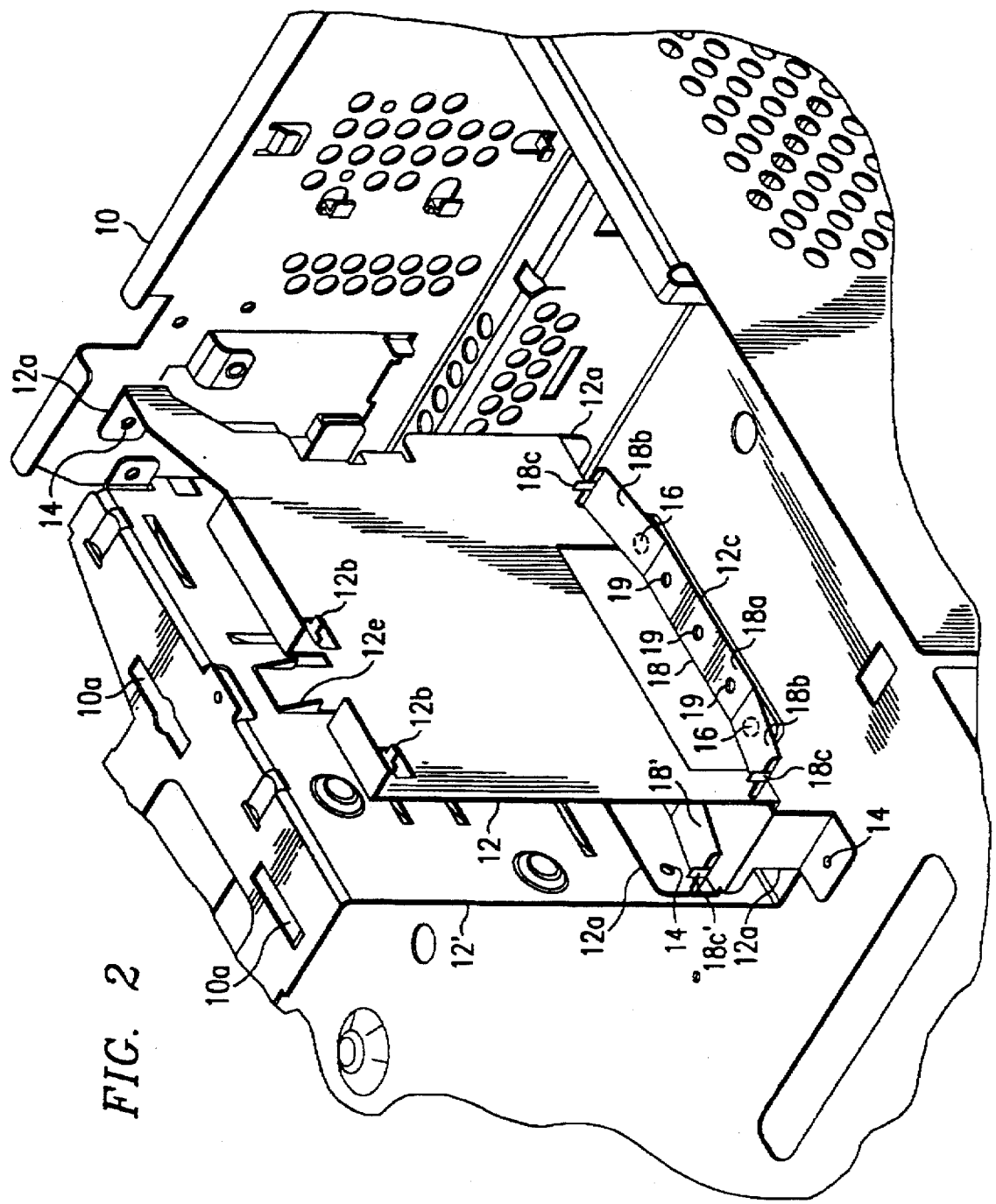
FIG. 2 is an isometric view illustrating an embodiment of a double-leaf spring mounted on the fixed bracket in the chassis according to the present invention.

A resilient leaf spring 18, FIG. 2, including a base portion 18a and a pair of opposed leaves 18b extending from base portion 18a, is connected by rivets 19 or the like to flange 12c. Leaves 18b are bent upwardly, as viewed in FIG. 2, and each leaf includes a tab 18c formed therewith and extending therefrom. Elastomer pads 16 are illustrated hidden below leaves 18b in FIG. 2. Bracket 12 also includes a flexible hook 12e formed therewith and extending therefrom.

Figure 3:
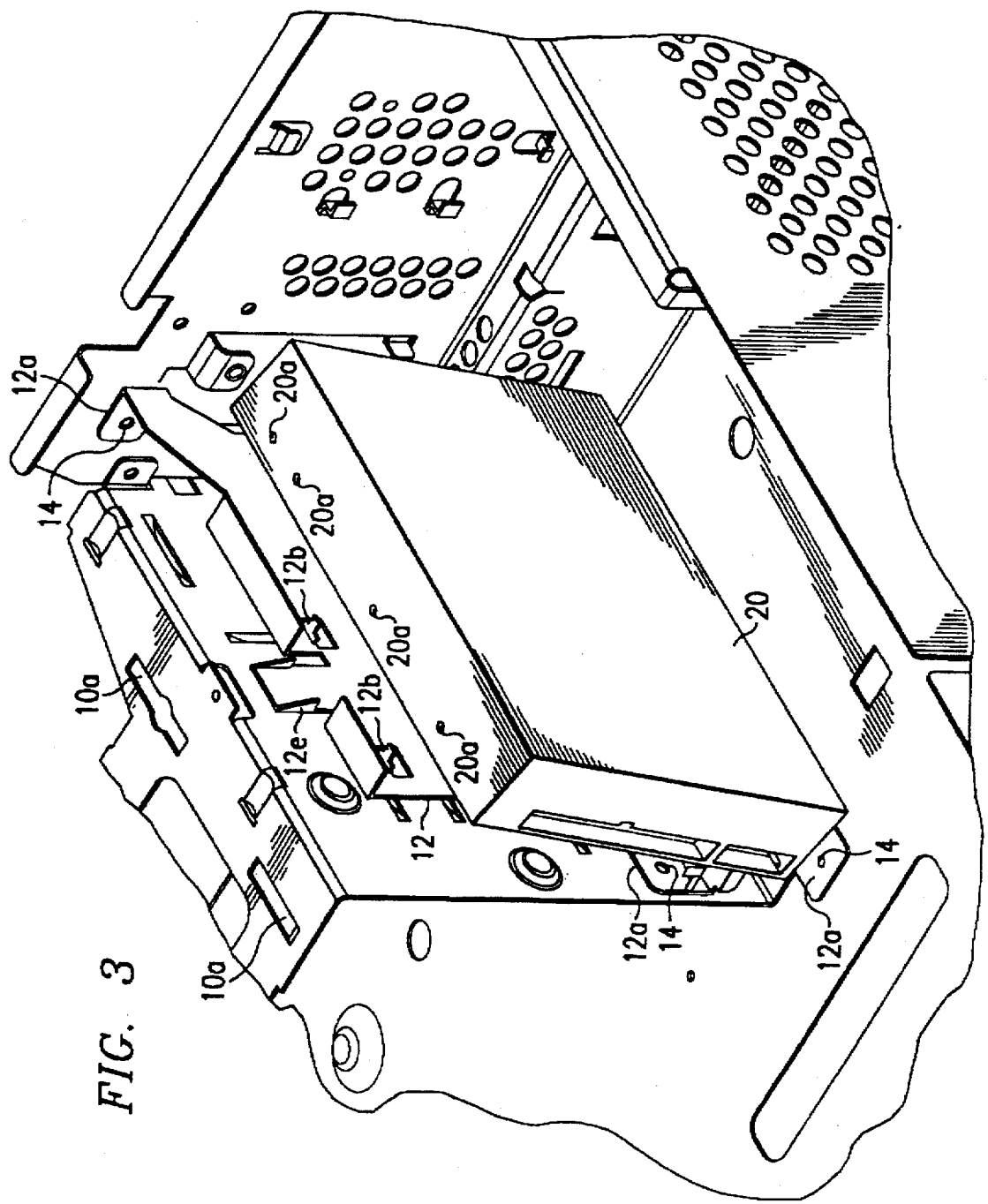
FIG. 3 is an isometric view illustrating an embodiment of a hard drive mounted on the spring and fixed bracket in the chassis according to the present invention.
Figure 4:
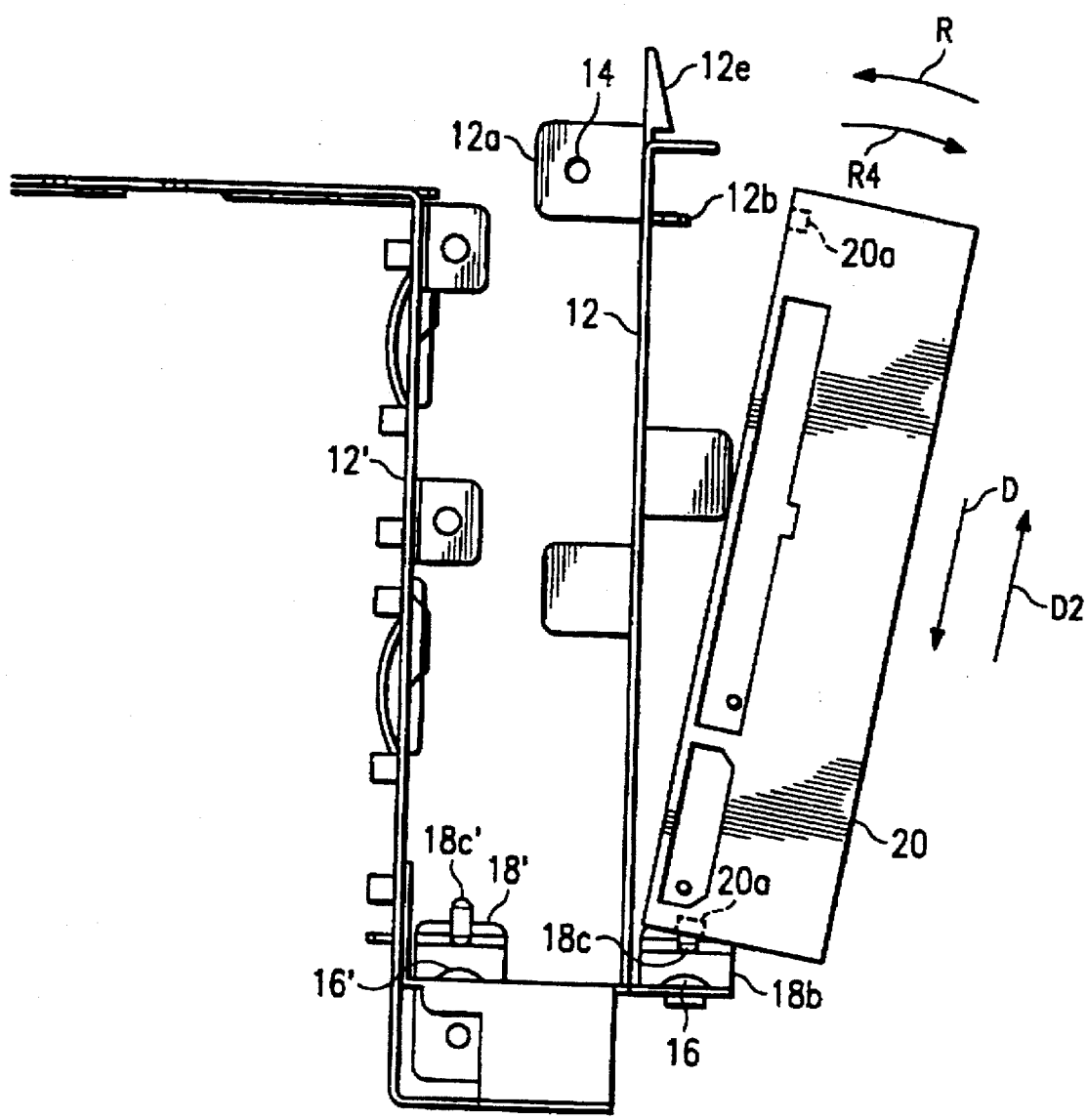
FIG. 4 is a partial side view further illustrating the hard drive mounted on the spring and fixed bracket in the chassis.

A commercially available hard drive 20 is illustrated in FIGS. 3 and 4. Hard drive 20 includes a plurality of threaded receptacles 20a formed therein to receive screws (not shown) for mounting hard drive 20 to a bracket in prior art devices. Those same receptacles 20a are advantageously used in the present invention to be releasably engaged by tabs 12b extending from bracket 12, and tabs 18c extending from leaf spring 18. Location and spacing of all the above-mentioned tabs are provided for mating alignment with ones of the threaded receptacles 20a.

Figure 5:
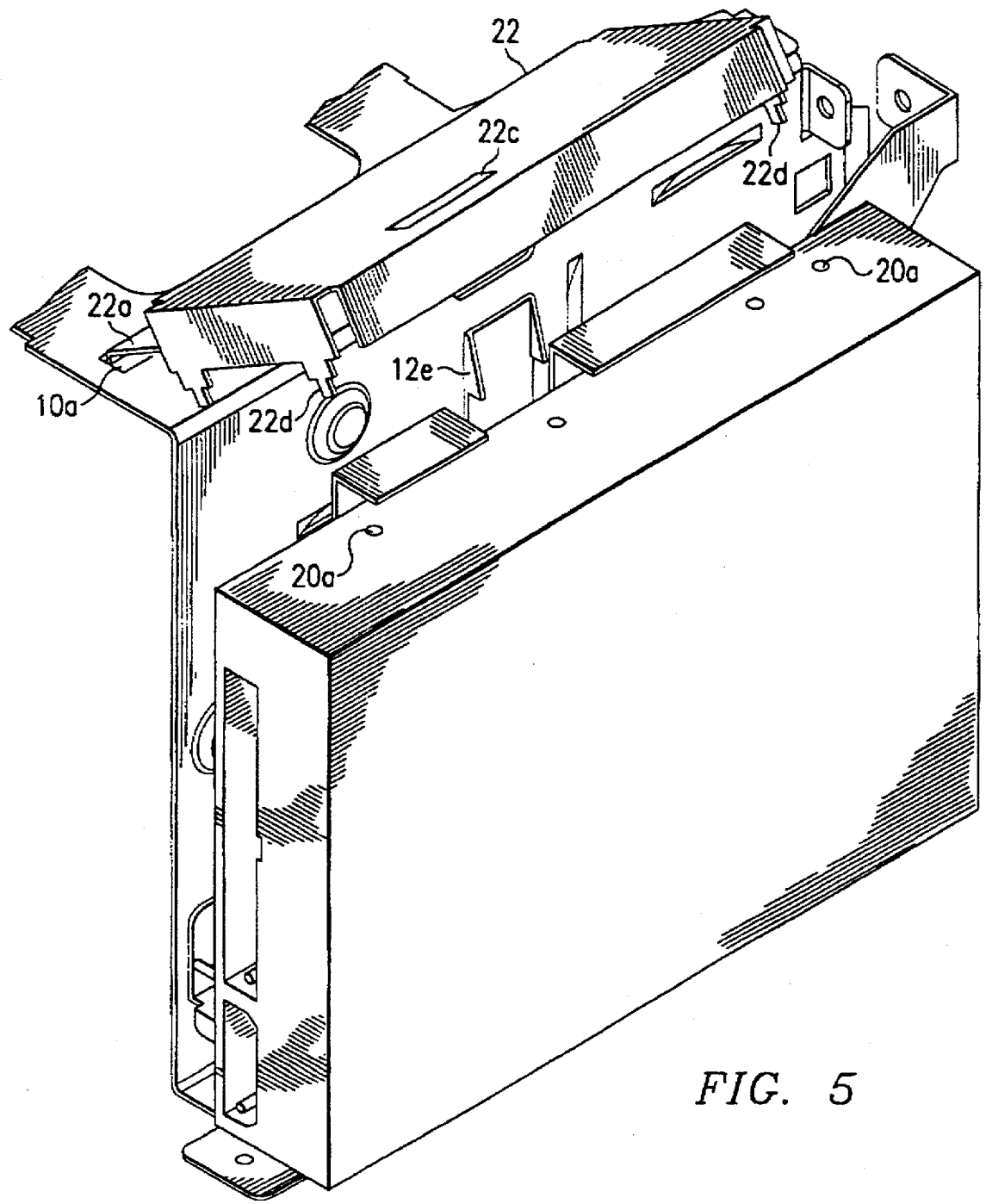
FIG. 5 is an isometric view illustrating the hard drive mounted on the spring and fixed bracket in the chassis and further illustrates an embodiment of an additional movable bracket mounted in the chassis in accordance with the present invention.
Figure 6:
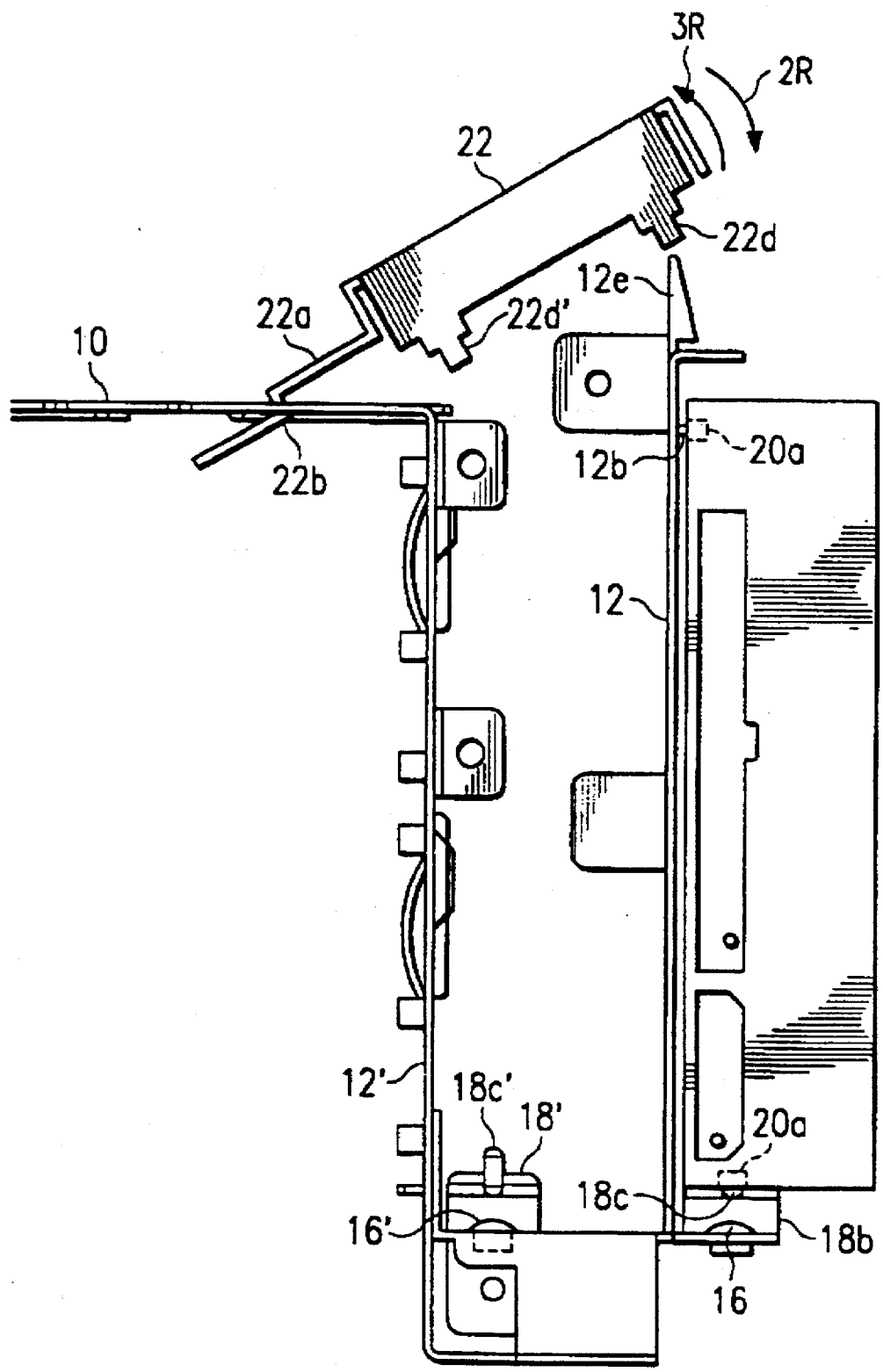
FIG. 6 is a partial side view further illustrating the hard drive mounted on the spring and fixed bracket in the chassis and includes the movable bracket mounted in the chassis.
Figure 7:
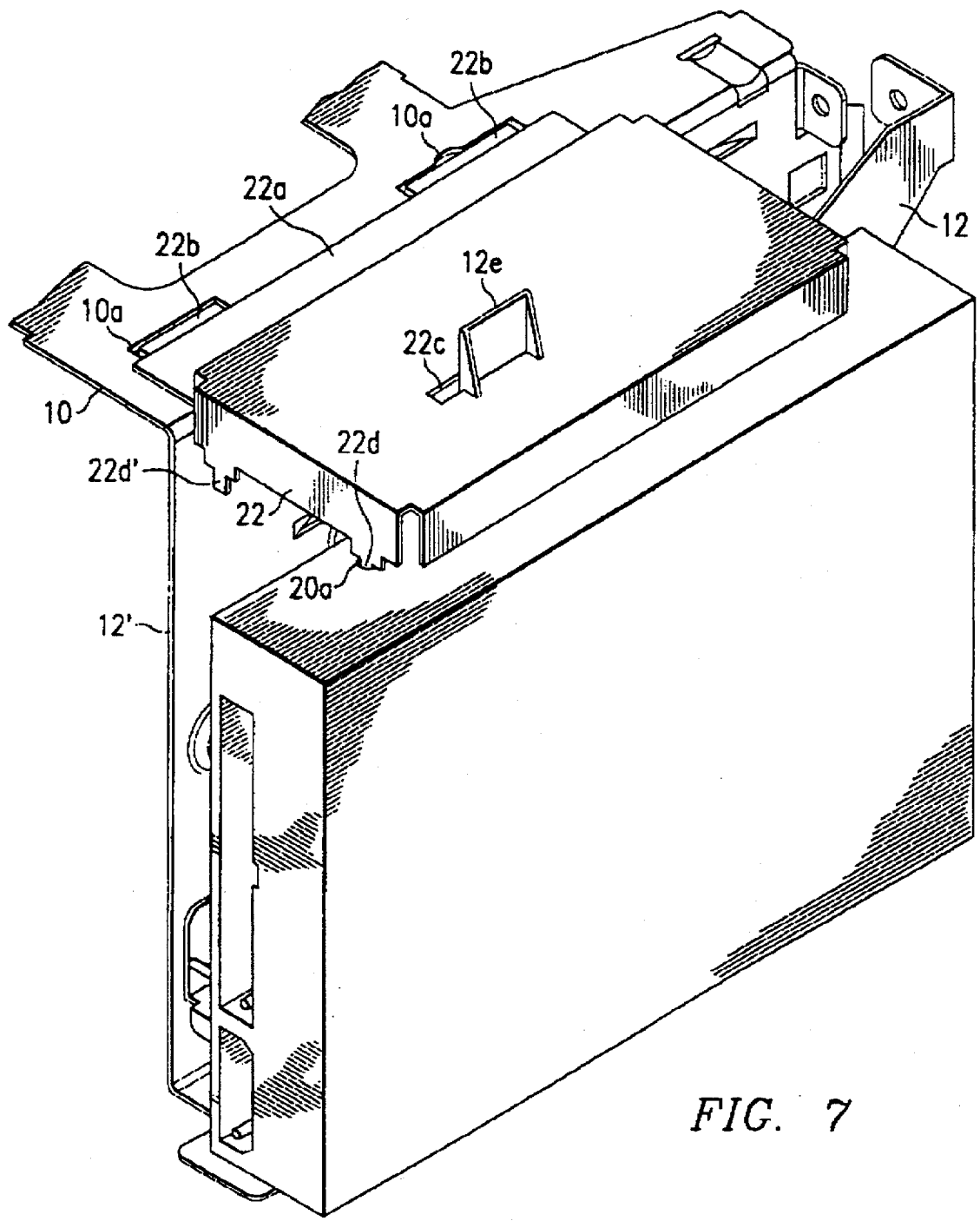
FIG. 7 is an isometric view illustrating the fixed and movable brackets engaged.

A movable bracket 22, FIGS. 5, 6 and 7, includes an extension plate 22a formed therewith and a pair of "S" shaped extensions 22b to be received by a pair of side-by-side slots, 10a formed in chassis 10. Extensions 22b include an "S" shaped bend formed therein so that bracket 22 can be rotatably moved relative to chassis 10 when extensions 22b are inserted through slots 10a, and also so that the "S" bends in extensions 22b can engage slots 10a and limit movement therein of extensions 22b. Bracket 22 also includes a slot 22c (FIGS. 5 and 7) formed therein for receiving and releasably engaging flexible hook 12e of bracket 12. In addition, bracket 22 further includes two tabs 22d formed with and extending therefrom (see FIG. 5). Location and spacing of tabs 22d are likewise provided for mating engagement with other ones of the threaded receptacles 20a.

In operation, the first or rigidly mounted bracket 12 (FIGS. 1 and 2) is attached to chassis 10 by means of rivets 14, and resilient leaf spring 18 is attached to flange 12c of bracket 12 by means of rivets 19, so that opposed leaves 18b having tabs 18c are exposed for engagement with hard drive 20. Hard drive 20 (FIGS. 3 and 4) including threaded holes 20a formed therein, is seated on leaf spring 18 so that tabs 18c on leaves 18b engage respectively aligned ones of the holes 20a. Hard drive 20 is moved in a first or downward direction as viewed in FIG. 4 so as to urge and compress leaves 18b into engagement with elastomer pads 16. This downward direction is indicated by the directional arrow designated D in FIG. 4.

Movement of hard drive 20 in the manner just described permits alignment of tabs 12b of bracket 12 with others of the holes 20a in hard drive 20. Thus, a second or rotating movement of hard drive 20 in a direction indicated by the directional arrow designated R in FIG. 4, permits tabs 12b to respectively engage the appropriate holes 20a. Once engagement is accomplished, a reaction force or preload acting on hard drive 20 due to compression of leaves 18b limits unassisted movement of hard drive 20.

The second or movably mounted bracket 22, including slot 22c and tabs 22d, FIG. 5, is now rotated in a direction indicated by the directional arrow designated 2R in FIG. 6. Rotation occurs substantially about the "S" bend in extensions 22b inserted through slot 10a in chassis 10, FIG. 7. This rotation permits flexible hook 12e of bracket 12 to enter slot 22c, and eventually engage bracket 22 when tabs 22d become seated in still others of the holes 20a in hard drive 20. Engagement of flexible hook 12e with bracket 22 and engagement of tabs 22d in appropriate holes 20a of hard drive 20 further limits unassisted movement of hard drive 20.

The result is a secure and releasable mounting of hard drive 20 on bracket 12 in chassis 10. Tabs 18c, 12b and 22d (FIGS. 6 and 7) are sized to be releasably engaged and disengaged from their respective holes 20a without threaded engagement, and flexible hook 12e is sized to be releasably engaged and disengaged with slot 22c (FIG. 7) when hard drive 20 is to be either installed in chassis 10 or removed therefrom without the use of screws.

When it is desired to remove hard drive 20 from the above-mentioned mounting on bracket 12, the flexible hook 12e is manually urged out of engagement with bracket 22 and bracket 22 is rotated in a direction indicated by the directional arrow 3R in FIG. 6. This rotation permits release of flexible hook 12e through slot 22c and removal of tabs 22d from their respective holes 20a. A downward pressure in the direction indicated by the directional arrow D as described above, concurrent with a rotation of hard drive 20 in a direction indicated by the directional arrow designated R4 in FIG. 4, permits tabs 12b to be released and disengaged from the appropriate holes 20a. Hard drive 20 can now be lifted in a direction indicated by the directional arrow designated D2 in FIG. 4 to release and disengage tabs 18c of spring 18 from their respective holes 20a in hard drive 20.

As it can be seen, the principal advantage of the present invention is that the hard drive can be quickly dropped into place and held in position without the use of screws. This also provides for quick removal of the hard drive. Another advantage is that there are spring and damper elements in the present invention that limit EMI, RFI, shock and vibration problems.

Due to the provisions of the present invention, a hard drive can be mounted without screws in a secure manner so that the hard drive can withstand the environment it is placed in. This is accomplished in the present invention by the brackets, one of which is rigidly mounted and the other of which is movably mounted in the CPU chassis. This combination of brackets securely holds the hard drive using the standard threaded mounting holes provided in the drives for use with screws, which are not required to be used in accordance with this invention. Electrical grounding is also provided with the resilient mounting spring and the elastomer pads provide vibration damping needed due to the varying rotational speeds of different drives.

The provision of the spring and the preload connection with the hard drive serves a dual purpose of helping to secure the hard drive in place while also assuring that enhanced ground contact will be maintained. Similarly, the provision of the elastomer pads serves a dual purpose of providing damping for vibrations produced by operation of the hard drive while also supporting the drive in a manner sufficient to limit shipping damage.

Furthermore, the provision of the thread-free tabs for quick engagement and release with the threaded holes in the hard drive, helps to hold the hard drive in the desired position in a mechanical quick connect, quick disconnect manner. This holding action is however, greatly enhanced by the movable bracket which includes the slot for facilitating engagement with the flexible hook provided on the rigidly mounted bracket. This arrangement provides additional means for securing the position of the hard drive. Also, when the cover (not shown) of the CPU is mounted on the chassis, a tab formed on the cover, engages the flexible hook to protect against unintentional release of the hook.

It is understood that several variations may be made in the foregoing without departing from the scope of the invention. It is possible, in accordance with the present invention, to provide bracket 12 in a side-by-side arrangement with multiple hard drive mounting capabilities. For example, FIGS. 6 and 7 best illustrate provision of a bracket 12' mounted in parallel with bracket 12. Also note that an additional leaf spring 18' and elastomer pads 16' (FIG. 6) are provided on bracket 12'. In this manner, and with the provision of appropriate tabs (not shown) on bracket 12', tabs 18c' on leaf spring 18' and tabs 22d' on bracket 22, along with any other necessary or desired modifications, a second hard drive (not shown) could be mounted adjacent hard drive 20. Additional hard drives could be so mounted if desired.

Although illustrative embodiments of the invention have been shown and described, a wide range of modification, change and substitution is contemplated in the foregoing disclosure and in some instances, some features of the present invention may be employed without a corresponding use of other features. Accordingly, it is appropriate that the appended claims be construed broadly and in a manner consistent with the scope of the invention.

What is claimed is:

1. In a computer system having a chassis for mounting a hard drive thereon, apparatus for mounting the hard drive without the use of screws comprising:

a first bracket being rigidly mounted on the chassis and including means for releasably engaging the hard drive;

a second bracket being movably mounted on the chassis and including means for releasably engaging the hard drive; and, means for releasably interconnecting the first and second brackets.

2. The apparatus for mounting a hard drive as defined in claim 1 further comprising a resilient member mounted on the first bracket and means on the resilient member for releasably engaging the hard drive.

3. The apparatus for mounting a hard drive as defined in claim 2 wherein the resilient member is a leaf spring including a base portion and a pair of opposed leaves extending therefrom.

4. The apparatus for mounting a hard drive as defined in claim 3 wherein the means on the resilient member for releasably engaging the hard drive comprises a tab extending from each of the opposed leaves.

5. The apparatus for mounting a hard drive as defined in claim 3 further comprising elastomer pads mounted between the first bracket and the opposed leaves.

6. The apparatus for mounting a hard drive as defined in claim 1 wherein the second bracket includes a pair of extension members extending therefrom and the chassis includes a pair of slots formed therein, the slots being positioned for receiving the pair of extension members.

7. The apparatus for mounting a hard drive as defined in claim 6 wherein the pair of extension members each include a bend formed therein, each bend engaging a respective one of the slots, whereby the second bracket is mounted for rotational movement relative to the chassis.

8. The apparatus for mounting a hard drive as defined in claim 1 further comprising a flexible hook extending from the first bracket, the second bracket including a slot formed therein, the slot being positioned for receiving the flexible hook.

9. The apparatus for mounting a hard drive as defined in claim 2 wherein the means for releasably engaging the hard drive includes a plurality of tabs formed on each of the first and second brackets and on the resilient member.

10. The apparatus for mounting a hard drive as defined in claim 2 wherein the means for releasably engaging the hard drive includes a plurality of tabs extending from each of the first bracket and the resilient member.

11. The apparatus for mounting a hard drive as defined in claim 10 wherein engagement of the hard drive with the tabs extending from the resilient member and the first bracket provides an induced preload on the hard drive.

12. In a computer system having a chassis for mounting a hard drive thereon, apparatus for providing a mechanical quick connect, quick disconnect mounting for the hard drive comprising:

a first and a second bracket, the first bracket being mounted on the chassis and including means for releasably engaging the hard drive, the second bracket being mounted on the chassis and including means for releasably engaging the hard drive and means for releasably engaging the first bracket;

a resilient member mounted on the first bracket; and means on the resilient member for releasably engaging the hard drive.

13. The apparatus for mounting a hard drive as defined in claim 12 further comprising elastomer pads mounted between the first bracket and the resilient member.

14. The apparatus for mounting a hard drive as defined in claim 12 wherein the first bracket is fixedly connected to the chassis.

15. The apparatus for mounting a hard drive as defined in claim 12 wherein the second bracket is movably mounted on the chassis.

16. The apparatus for mounting a hard drive as defined in claim 12 wherein the second bracket is mounted for rotational movement relative to the chassis.

17. The apparatus for mounting a hard drive as defined in claim 16 further comprising a flexible hook connected to the first bracket, the second bracket including a slot formed therein, the slot being positioned for receiving the flexible hook in response to rotation of the second bracket.

18. The apparatus for mounting a hard drive as defined in claim 12 wherein the means for releasably engaging the hard drive includes a plurality of tabs formed on each of the first and second brackets and on the resilient member.

19. The apparatus for mounting a hard drive as defined in claim 12 wherein the means for releasably engaging the hard drive includes thread-free tabs on the first bracket and on the resilient member for mounting the hard drive on the first bracket under an induced preload.

20. In a computer system having a chassis for mounting a hard drive thereon, a method of mounting the hard drive without the use of screws comprising the steps of:

mounting a first bracket in the chassis;

attaching a resilient member on a first portion of the first bracket;

engaging the hard drive with the resilient member;

moving the hard drive to compress the resilient member and to engage the hard drive with a second portion of the first bracket;

mounting a second bracket for movement on the chassis; and moving the second bracket into releasable engagement with the first bracket and with the hard drive.

21. The method of mounting a hard drive as defined in claim 20 wherein the step of moving the second bracket comprises the step of rotating the second bracket relative to the chassis.

* * * * *